US009093906B2

United States Patent
Zhang et al.

(10) Patent No.: US 9,093,906 B2
(45) Date of Patent: Jul. 28, 2015

(54) PROTECTION FOR INADVERTENT MISSING FEEDBACK VOLTAGE SIGNAL

(75) Inventors: Guangchao (Darson) Zhang, San Jose, CA (US); Yury Gaknoki, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 397 days.

(21) Appl. No.: 13/249,060

(22) Filed: Sep. 29, 2011

(65) Prior Publication Data

US 2013/0083572 A1    Apr. 4, 2013

(51) Int. Cl.
*H02M 7/10* (2006.01)
*H02M 3/335* (2006.01)
*H02M 1/00* (2007.01)

(52) U.S. Cl.
CPC .. *H02M 3/33507* (2013.01); *H02M 2001/0003* (2013.01)

(58) Field of Classification Search
CPC ..................... H02M 3/33523; H02M 3/33507; H02M 1/32
USPC ............... 363/21.12–21.13, 21.15–21.16, 50, 363/56.03, 56.07–56.08, 56.1, 56.11–56.12
See application file for complete search history.

(56) References Cited

U.S. PATENT DOCUMENTS

| 5,438,499 | A | * | 8/1995 | Bonte et al. | 363/21.16 |
| 5,796,596 | A | * | 8/1998 | Williams | 363/21.16 |
| 6,385,060 | B1 | * | 5/2002 | Basso et al. | 363/21.15 |
| 2007/0035281 | A1 | * | 2/2007 | Kuroiwa et al. | 323/222 |
| 2008/0247199 | A1 | | 10/2008 | Djenguerian et al. | |
| 2009/0231888 | A1 | * | 9/2009 | Baurle et al. | 363/21.12 |
| 2010/0054000 | A1 | * | 3/2010 | Huynh | 363/21.16 |
| 2011/0018516 | A1 | * | 1/2011 | Notman et al. | 323/284 |
| 2011/0234255 | A1 | * | 9/2011 | Chobot | 324/764.01 |
| 2011/0261596 | A1 | * | 10/2011 | Zong et al. | 363/21.13 |

FOREIGN PATENT DOCUMENTS

CN    101282078 A    10/2008

OTHER PUBLICATIONS

Office Action Received for Chinese Patent Application No. 201210369580.2, mailed on Sep. 15, 2014, 25 pages (15 pages of English Translation and 10 pages of Official Copy).
Office Action received for Chinese Patent Application No. 201210369580.2, with English Translation, issued on May 5, 2015, 6 pages.

* cited by examiner

*Primary Examiner* — Adolf Berhane
*Assistant Examiner* — Henry Lee, III
(74) *Attorney, Agent, or Firm* — Blakely Sokoloff Taylor & Zafman LLP

(57) ABSTRACT

Methods and apparatuses are disclosed for providing improved feedback sampling in a primary-side regulated power converter. A test sample may be taken prior to the default feedback sample. The voltage of the test sample may be compared to the voltage of the default feedback sample to determine if the voltage difference between the two samples exceeds a threshold. If the default sample is lower than the test sample by more than the threshold, the default sample may be flagged as being a potential false sample. If more than a set number of potentially false samples are obtained, the power converter may enter an auto-restart mode.

28 Claims, 9 Drawing Sheets

$V_{TEST} - V_{SAMPLE} \leq V_{TH}$

GOOD SAMPLE DETECTED $V_{TEST} - V_{SAMPLE} > V_{TH}$

BAD SAMPLE DETECTED

PROTECTION FOR INADVERTENT MISSING FEEDBACK VOLTAGE SIGNAL

BACKGROUND

1. Field

The present disclosure relates generally to power converters, and, more specifically, the present disclosure relates to sensing the output voltage of a power converter.

2. Related Art

Many electrical devices, such as cell phones, personal digital assistants (PDAs), laptops, and the like, are powered by relatively low-voltage, direct-current (dc) power sources. Since power is typically delivered through a wall outlet as high-voltage, alternating-current (ac) power, a device generally referred to as a switching-power converter is typically used to transform the high-voltage ac power to low-voltage dc power. These converters generally use a controller to switch a power switch between an ON state and an OFF state to control the amount of power transmitted to the output of the converter and delivered to a load.

In certain applications, switching-power converters may include an energy transfer element to separate an input side of the power converter from an output side of the power converter. More specifically, an energy transfer element may be used to provide galvanic isolation that prevents dc current between the input and the output of the power converter. Common examples of energy transfer elements include transformers and coupled inductors, where electrical energy is converted to magnetic energy that is converted back to electrical energy at the output side across an output winding.

One typical way of regulating power, referred to as primary-side regulation, may include obtaining feedback information using a bias winding that is electrically coupled to the input side of the power converter such that the bias winding is also magnetically coupled to the output winding of the energy transfer element. This allows the bias winding to produce a voltage representative of the output voltage of the power converter that is accessible from the input side. In this manner, the switching-power converter may acquire a feedback signal representative of the output voltage without directly sensing the output voltage at the output of the converter. During operation, the power converter may regulate its output voltage by adjusting the frequency and duration of the switching events in response to the feedback from the bias winding. By adjusting the frequency and duration of the switching events, the converter may control the amount of energy transferred from an input of the power supply to the output.

While this method is generally effective during certain transient conditions, primary side sensing may obtain false samples of the feedback signal. Typically, the feedback signal from the bias winding is representative of the output voltage only a portion of the time. Thus, when implementing primary side control, sensing may only be conducted during specific times when the bias winding voltage is representative of the output voltage. A controller may be designed to sense the bias voltage at a very specific time. In certain cases, the controller may sense the bias voltage at an incorrect time due to pre-set sensing signals that may not account for a transient condition and therefore not sample the output voltage waveform at the appropriate time that it is representative of the output voltage. As a result, the power converter may determine energy delivery based on incorrect information. This may cause the output voltage to fall out of regulation.

BRIEF DESCRIPTION OF THE FIGURES

The above and other aspects, features, and advantages of several embodiments of the present invention will be more apparent from the following more particular description thereof, presented in conjunction with the following drawings.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
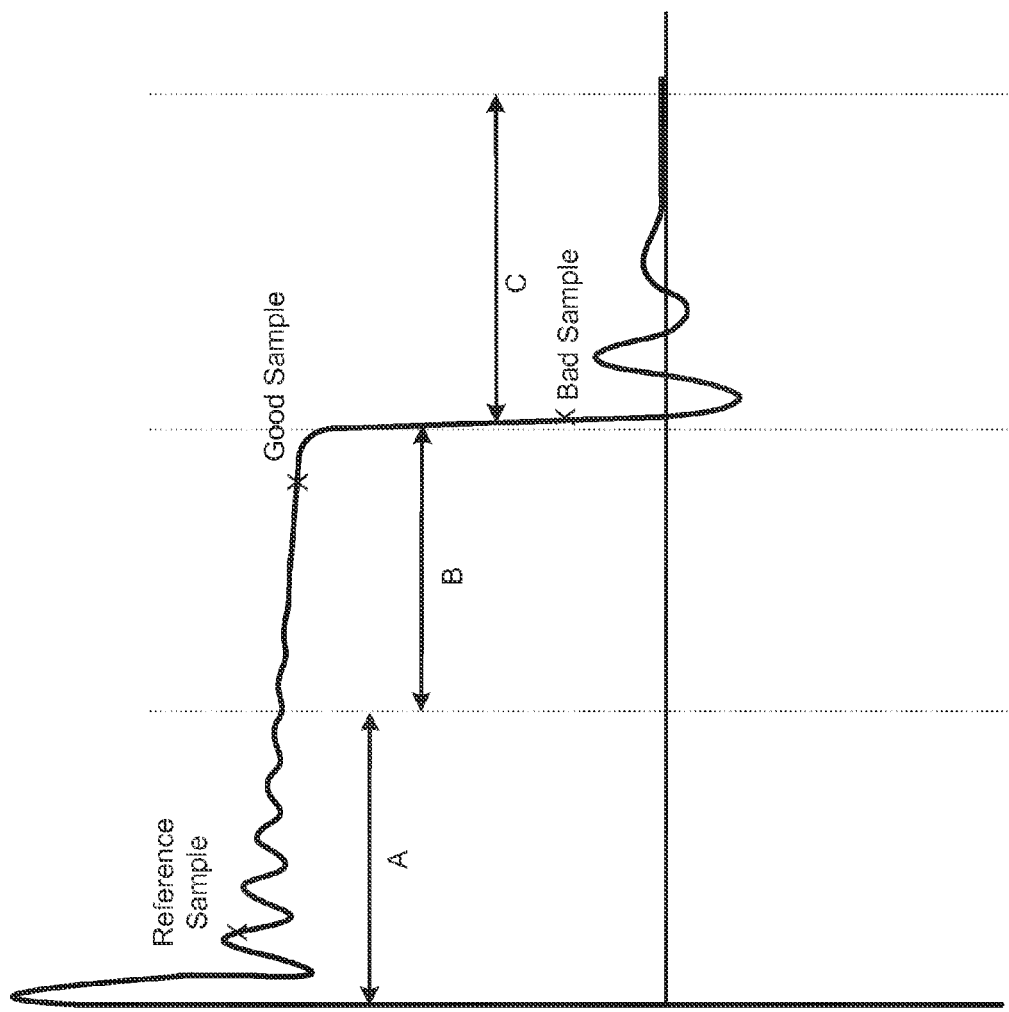
FIG. 1 is an example voltage waveform illustrating the voltage on an output winding of a power converter in accordance with an embodiment of the present invention.

Generally, power converters using primary-side regulation, also known as primary-side sensing, may sample the voltage of a bias winding a length of time after switching the power switch to the OFF state. This is done since the bias winding voltage may only represent the output voltage of the power converter during a portion of the time after the switch has switched to an OFF state. For example, FIG. 1 illustrates the voltage on the output winding of a power converter shortly after the power switch is switched to the OFF state. As shown, the voltage on the output winding experiences an initial spike and ripple in the voltage shortly after the switching event. This period of time is labeled as section A in FIG. 1. If a sample is taken during this period, an incorrect voltage reading may be obtained due to the relatively large ripple in the output winding voltage. However, eventually, the output winding voltage becomes relatively stable for a period of time during which the output winding voltage is most representative of the output voltage (labeled as section B in FIG. 1) before quickly dropping off (labeled as section C in FIG. 1) when all the energy is transferred to the output side of the power converter. As a result, a power converter controller is designed to generally wait a fixed length of time before sampling the bias winding voltage in an attempt to measure the output winding voltage during the relatively stable period of time labeled B.

While this method generally produces reliable samples, the duration of the periods of time labeled A, B, and C do not remain constant during operation of the power converter. Thus, it is possible that the duration of periods A and B may become sufficiently short such that the power converter, when using a fixed sampling time, may obtain a sample during period C, resulting in a voltage sample that is significantly lower than the actual output voltage. In response to the low voltage sample taken during period C, the power converter may attempt to deliver more energy to the output, causing the output voltage to increase, which in turn causes the combined duration of periods A and B to further decrease. Consequently, subsequent sampling of the bias winding voltage may continue to occur during period C, resulting in more samples incorrectly indicating a low output voltage. Conventional primary-side regulated power converters are unable to recover from this condition, resulting in an excessive output voltage.

Figure 2:
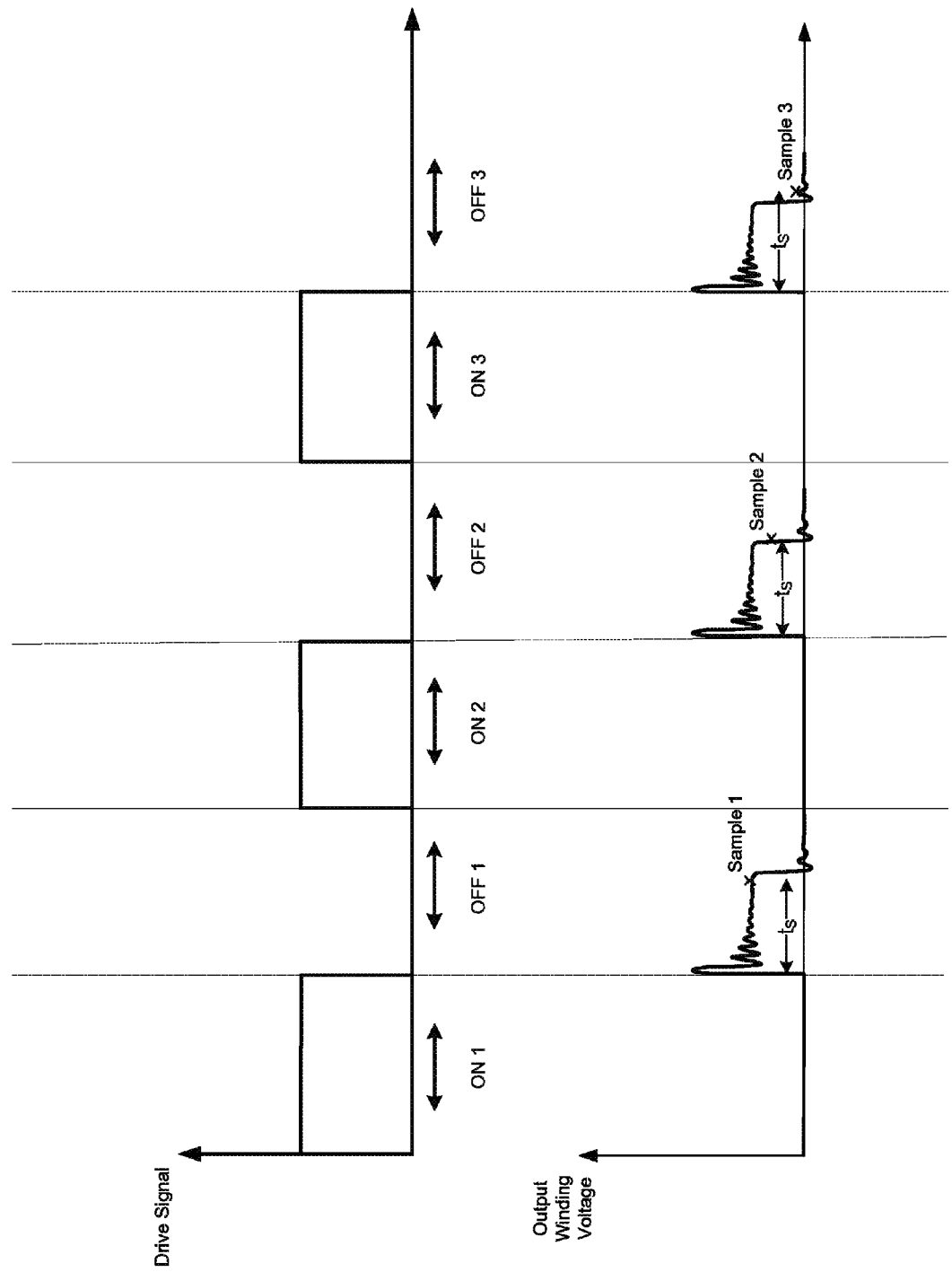
FIG. 2 are example voltage waveforms illustrating a drive signal for controlling a power switch and the corresponding voltages on an output winding of a power converter in accordance with an embodiment of the present invention.

To illustrate, FIG. 2 shows voltage waveforms for a drive signal for controlling a power switch and the resulting voltage across the output winding of a primary-side regulated power converter. During the first on period ON 1 of the drive signal, there is substantially zero voltage across the output winding. However, after the drive signal goes low during the OFF 1 period, the voltage across the output winding behaves in a manner similar to the voltage waveform shown in FIG. 1. After $t_S$ seconds of the OFF 1 period, a first sample Sample 1 is taken during the relatively stable portion of the output voltage. This sample is representative of the voltage on the output winding of the power converter and is thus considered a good sample. However, after Sample 1 is taken, the output voltage of the power converter may increase, due to, for example, removal of the load. As a result, during the OFF 2 period, the conduction time of the output diode is reduced to a duration less than $t_S$ seconds. Thus, when Sample 2 is generated $t_S$ seconds into the OFF 2 period, the sample voltage is significantly lower than the actual output winding voltage. Thus, Sample 2 is a false sample. In response to the low feedback sample, the power converter may attempt to increase the power delivered to the output, further increasing the output voltage. As a result, during the OFF 3 period, where the sample voltage is significantly lower than the actual output winding voltage, the diode conduction time is further reduced, causing another bad sample Sample 3 to be obtained $t_S$ seconds into the period. If this pattern were to continue, more power would be delivered to the output during every subsequent switching cycle, thereby causing the output voltage to continue to rise, resulting in a runaway condition.

As an overview, embodiments of the present disclosure provide improved feedback sampling in a primary-side regulated power converter. In the various embodiments, a test sample is taken prior to the default feedback sample. The voltage of the test sample may be compared to the voltage of the default feedback sample to determine if the voltage difference between the two samples exceeds a threshold. If the default sample is lower than the test sample by more than the threshold, the default sample may be flagged as being a potential false sample, for example, a sample taken during period C of FIG. 1. The controller of the power converter may detect when more than a threshold number of potentially false samples are obtained.

Figure 3:
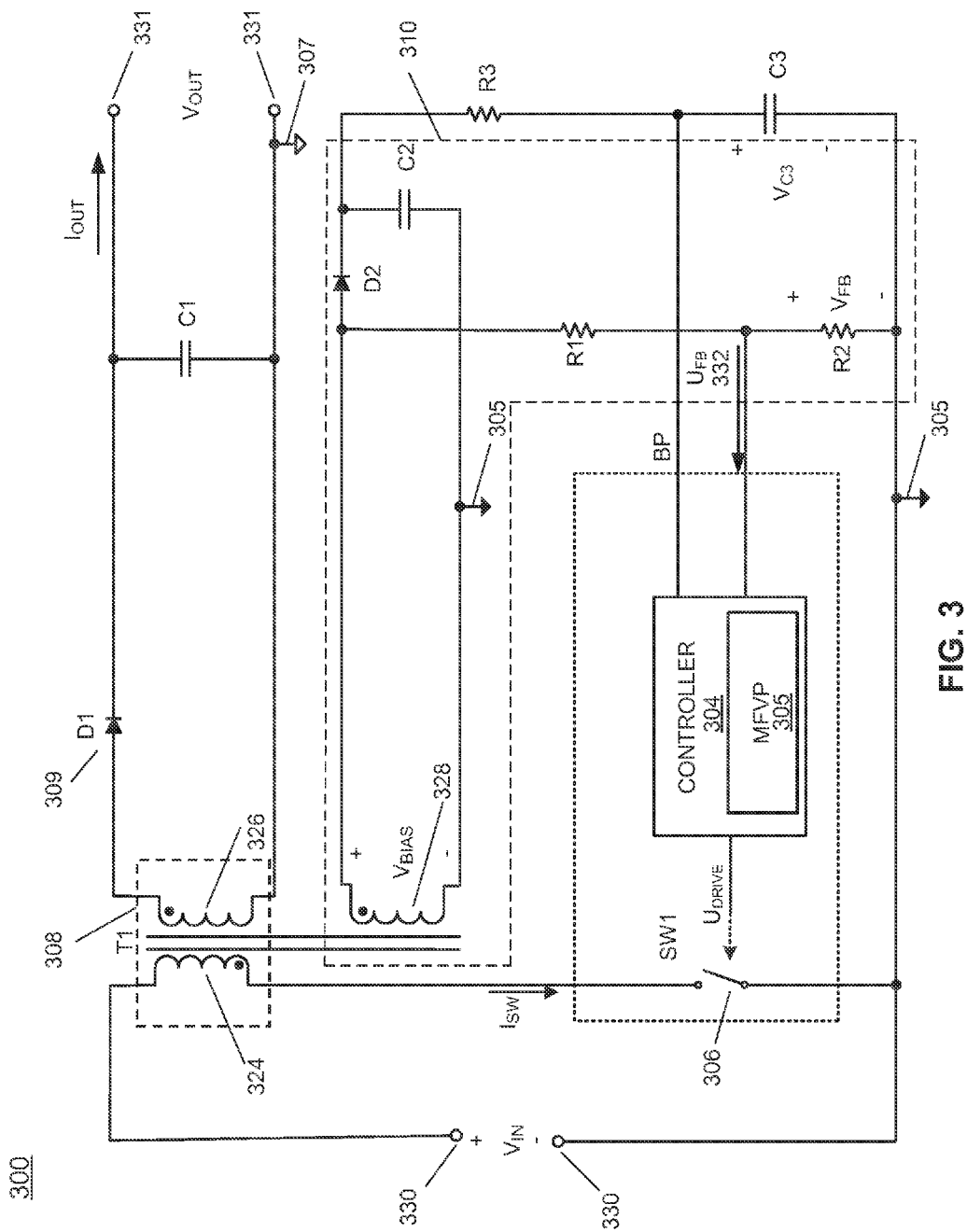
FIG. 3 is a functional block diagram illustrating an example primary-side regulated power converter in accordance with an embodiment of the present invention.

To illustrate, FIG. 3 shows a functional block diagram of example power converter 300. In operation, power converter 300 provides a dc output having a voltage $V_{OUT}$ at output terminals 331, from an unregulated ac input having voltage $V_{IN}$ received at input terminals 330. In the illustrated example, power converter 300 includes controller 304, power switch 306, energy transfer element 308, output diode D1 309, output capacitor C1, capacitor C3, resistor R3, and bias winding feedback circuit 310. Bias winding feedback circuit 310 may include diode D2, capacitor C2, resistors R1-R2, and a bias winding 328 that is magnetically coupled to energy transfer element 308.

As shown in FIG. 3, energy transfer element 308 includes a coupled inductor having an input winding 324 and an output winding 326. The input winding may also be referred to herein as a "primary winding," and the output winding may also be referred to herein as a "secondary winding." Energy transfer element 308 provides galvanic isolation between the input side and the output side of power converter 300 to prevent dc current between the input side and the output side. An input return 305 is electrically coupled to circuitry being referred to as being on the "input side" of power converter 300. Similarly, an output return 307, which may be isolated and separate from input return 305, is electrically coupled to circuitry being referred to as being on the "output side" of power converter 300.

In operation, primary winding 324 may be coupled to power switch 306 such that energy transfer element 308 receives energy with an input current $I_{SW}$ when power switch 306 is in an ON state, and energy transfer element 308 delivers energy to the output of power converter 300 after power switch 306 is switched to an OFF state. An ON state may be defined as when switch 306 is able to conduct current and an OFF state may be defined when switch 306 is not able to substantially conduct current. In one example, power switch 306 may include a transistor, such as a metal oxide semiconductor field effect transistor (MOSFET), bipolar junction transistor (BJT), or any other transistor, or any other switch.

Controller 304 may be configured to control power switch 306 using a switching or drive signal, noted as $U_{DRIVE}$ in FIG. 3. The drive signal output by controller 304 may be coupled to the gate or control terminal of power switch 306 and may cause power switch 306 to switch between an ON state and an OFF state. Controller 304 may include an oscillator (not shown) that defines substantially regular switching periods during which switch 306 may be conducting in the ON state or not conducting in the OFF state. Controller may be powered by supply capacitor C3 through a bypass terminal BP. In operation, resistor R3 may be included to control the current in supply capacitor C3. As shown, controller 304 may be configured to regulate the output voltage of power converter 300 by switching power switch 306 between an ON state and an OFF state to control the amount of power delivered to the output. During a switching event, when power switch 306 is in an ON state, switch current $I_{SW}$ conducts through energy transfer element 308. The amount of switch current $I_{SW}$ conducted when switch 306 is ON is determined by the input voltage, the inductance of the primary winding, and the time that power switch 306 remains in the ON state. The switch current $I_{SW}$ is substantially zero, when power switch 306 is in the OFF state. When switch 306 switches from the ON state to the OFF state, current is conducted through secondary winding 326. The current is then rectified by output diode D1 and filtered by capacitor C1 to produce output voltage $V_{OUT}$ and output current $I_{OUT}$ at output terminals 331.

In operation, controller 304 may receive a feedback signal $U_{FB}$ 332 which is representative of the output voltage when output diode D1 is conducting. In one example, controller 304 may use feedback signal $U_{FB}$ 332 to adjust the rate, magnitude, and/or duration of the current pulses in primary winding 324 to provide the appropriate amount of power required to maintain a desired output voltage. Controller 304 may further include a missing feedback voltage protection (MFVP) circuit 305 for detecting potential false samples of feedback signal $U_{FB}$ taken by controller 304. MFVP circuit 305 will be described in greater detail below with respect to FIGS. 4-8.

As shown in FIG. 3, bias winding feedback circuit 310 is adapted to provide primary feedback by sending feedback signal $U_{FB}$ 332 to controller 304, which allows indirect sensing of the output voltage from the input side of the power supply. Feedback signal $U_{FB}$ 332 may be equivalent to, or a scaled version of, bias voltage $V_{BIAS}$. Due to the magnetic coupling in energy transfer element 308, energy is delivered to output winding 326 and to bias winding 328 after power switch 306 is switched to an OFF state. The magnetic coupling further causes the voltage induced across bias winding 328 to be substantially proportional to the voltage across output winding 326. The proportional relationship of voltage across output winding 326 and bias winding 328 is based on a turns ratio between the number or turns in output winding 326 to the number of turns of bias winding 328. Since the voltage across output winding 326 is only approximately 0.7 V (the approximate value of the output diode forward voltage drop) greater than the output voltage $V_{OUT}$ while diode D1 is conducting, bias voltage $V_{BIAS}$ increases to a voltage representative of the output voltage when energy is transferred during the OFF state of power switch 306. In some instances, controller 304 may use feedback signal $U_{FB}$ 332 to directly regulate bias voltage $V_{BIAS}$ to a desired voltage that is representative of a desired output voltage. For example, bias voltage $V_{BIAS}$ may be regulated to 10 V in order to indirectly regulate the output voltage to 5 V.

In some examples, supply voltage $V_{C3}$ includes a dc voltage component and also a time-varying voltage component referred to as a ripple voltage. Ripple voltage occurs due to the charging and discharging of supply voltage capacitor C3. Bias winding feedback circuit 310 may further include two or more resistors R1 and R2, forming a resistor divider to provide a divided-down or scaled bias voltage as the feedback signal $U_{FB}$ to controller 304.

In some examples, to implement the control described above, controller 304 (and its individual components) and switch 306 may be implemented as a monolithic integrated circuit, may be implemented with discrete electrical components, or may be implemented in a combination of discrete components and integrated circuits. In other examples, power switch 306 may not be included as part of the integrated circuit, and controller 304 may be coupled to a power switch that is manufactured as a device separate from controller 304.

Figure 4:
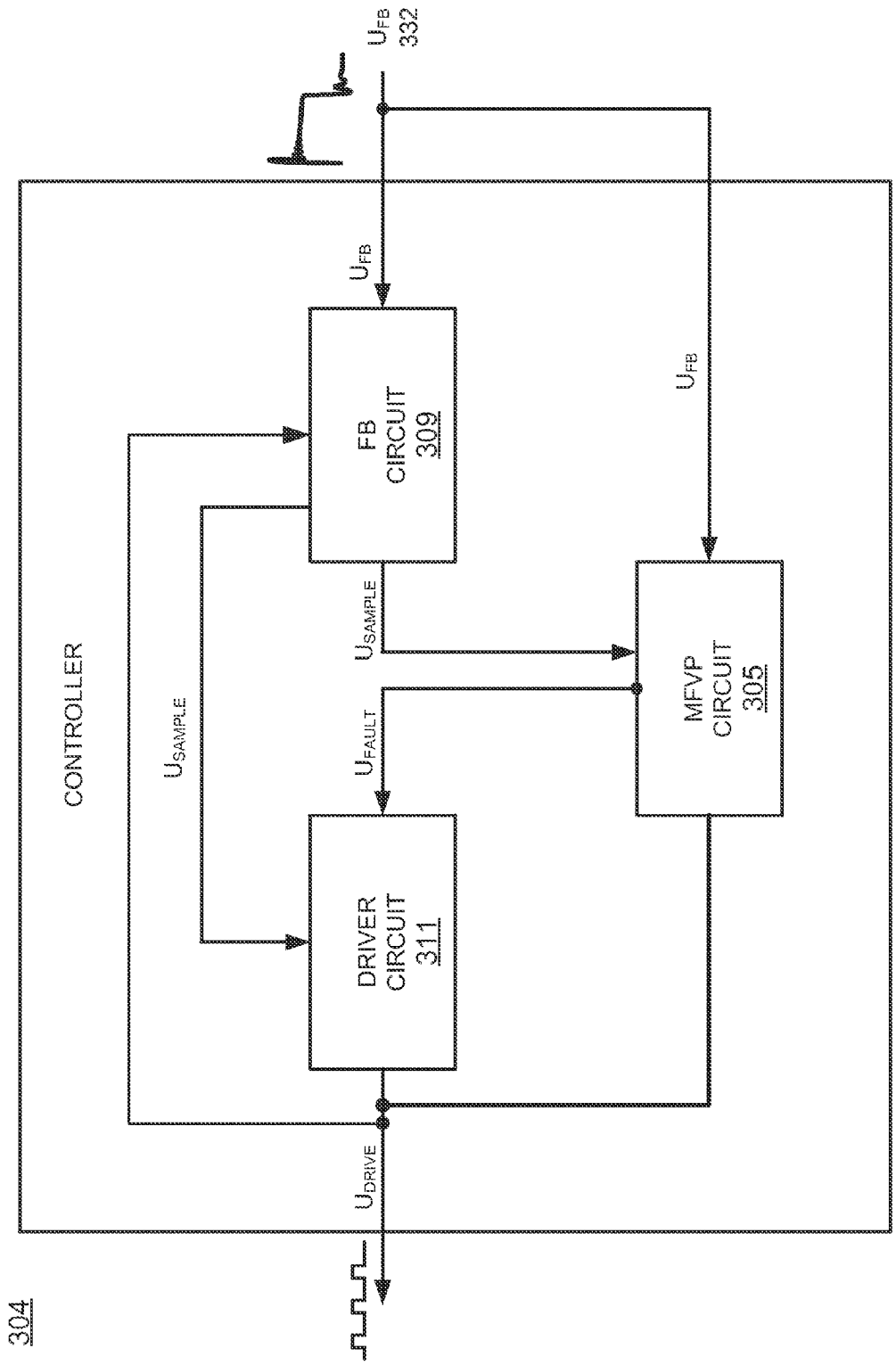
FIG. 4 is a functional block diagram illustrating an example controller that may be used in a primary-side regulated power converter in accordance with an embodiment of the present invention.

Referring now to FIG. 4, a block diagram of an example controller 304 for a power converter is shown. In the illustrated example, controller 304 includes a feedback (FB) circuit 309, driver circuit 311, and missing feedback voltage protection (MFVP) circuit 305. As shown, controller 304 receives feedback signal $U_{FB}$ 332 and outputs drive signal $U_{DRIVE}$ for controlling a power switch, such as power switch 306 of power converter 300.

Feedback circuit 309 may be configured to receive feedback signal $U_{FB}$ 332 from a feedback circuit or bias winding, for example, from bias winding 328 of bias winding feedback circuit 310. Feedback circuit 309 may further receive drive signal $U_{DRIVE}$ from driver circuit 311. Feedback circuit 309 may use drive signal $U_{DRIVE}$ to determine when the power switch is in an OFF state, and may sample feedback signal $U_{FB}$ 332 a set length of time after a falling edge of drive signal $U_{DRIVE}$ (when power switch 306 switches to an ON state from an OFF state). Feedback circuit 309 may output the sampled voltage of feedback signal $U_{FB}$ 332 as $U_{SAMPLE}$ and may transmit $U_{SAMPLE}$ to driver circuit 311 and MFVP circuit 305.

As shown, MFVP circuit 305 may be configured to receive feedback signal $U_{FB}$ 332, sample signal $U_{SAMPLE}$, and drive signal $U_{DRIVE}$. Similar to feedback circuit 309, MFVP circuit 305 may be configured to use drive signal $U_{DRIVE}$ to determine when the power switch is in an OFF state, and may sample feedback signal $U_{FB}$ 332 a set length of time after a falling edge of drive signal $U_{DRIVE}$. In some examples, MFVP circuit 305 may sample feedback signal $U_{FB}$ 332 before feedback circuit 309 samples feedback signal $U_{FB}$ 332. Based on the voltages sampled by feedback circuit 309 and MFVP circuit 305, MFVP circuit 305 may determine if $U_{SAMPLE}$ represents a false sample and if a fault condition has occurred as a result of the false sample. In response to a detected fault condition, MFVP circuit 305 may transmit a fault signal $U_{FAULT}$ to driver circuit 311 indicating that a fault condition may have occurred. In one example, when fault signal $U_{FAULT}$ is received by driver circuit 311, the power converter may enter into an auto-restart mode. An auto-restart mode is an open loop control method where power switch 306 switches for a period of time with consecutive ON cycles interleaved with periods where the power converter is inhibited from switching.

Driver circuit 311 may be configured to receive sample signal $U_{SAMPLE}$ from feedback circuit 309 and fault signal $U_{FAULT}$ from MFVP circuit 305. As mentioned above, fault signal $U_{FAULT}$ indicates that a fault condition has been detected by MFVP circuit 305. In some examples, driver circuit 311 may enter into an auto-restart mode in response to receiving fault signal $U_{FAULT}$.

Driver circuit 311 may be further configured to generate drive signal $U_{DRIVE}$ to control a power switch of a power converter. For example, $U_{DRIVE}$ may be used to control power switch 306 of power converter 300. Driver circuit 311 may be configured to generate the drive signal $U_{DRIVE}$ based at least in part on the samples $U_{SAMPLE}$ of feedback signal $U_{FB}$ 332. Based on these voltage samples, driver circuit 311 may adjust the frequency, duration, voltage, and the like, of drive signal $U_{DRIVE}$ to adjust the amount of power delivered to the output of a power converter. For example, if sampled signal $U_{SAMPLE}$ is representative of an output voltage that is below a desired output voltage, driver circuit 311 may be configured to increase the frequency, duration, voltage, or combinations thereof, of $U_{DRIVE}$ to deliver more power to the output of the converter. Similarly, if sampled signal $U_{SAMPLE}$ is representative of an output voltage that is above a desired output voltage, driver circuit 311 may be configured to reduce the frequency, duration, voltage, or combinations thereof, of $U_{DRIVE}$ to deliver less power to the output of the converter. While FB circuit 309, MFVP 305, and driver circuit 311 are shown as separate modules, it should be appreciated that all or some of the components of a module may be combined with some or all of the components of another module.

Figure 5:
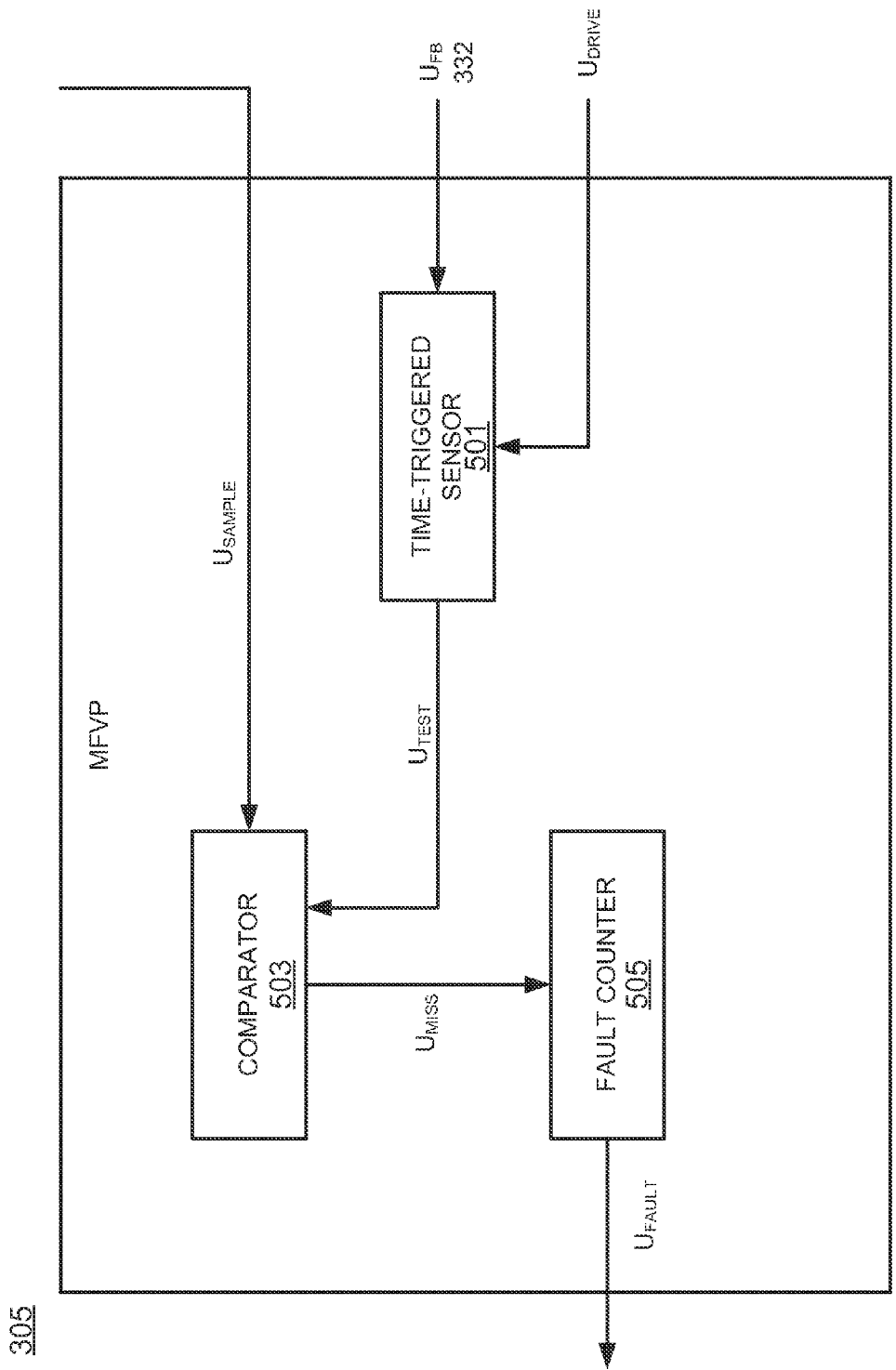
FIG. 5 is a functional block diagram illustrating an example missing feedback voltage protection circuit that may be used in a controller for a primary-side regulated power converter in accordance with an embodiment of the present invention.

Referring now to FIG. 5, a functional block diagram of MFVP circuit 305 is shown. As mentioned above, MFVP circuit 305 generally determines false voltage samples obtained by controller 304 and determines fault conditions caused by one or more of these false samples. MFVP circuit 305 may include time-triggered sensor 501 for receiving feedback signal $U_{FB}$ 332 and drive signal $U_{DRIVE}$. In some examples, time-triggered sensor 501 may be configured to obtain a test sample ($U_{TEST}$) of the voltage of feedback signal $U_{FB}$ 332 a set length of time after an occurrence of a triggering event associated with drive signal $U_{DRIVE}$. In one example, time-triggered sensor 501 may be configured to sample the voltage of feedback signal $U_{FB}$ 332 about 0.8 µs after a negative edge (representative of power switch switching to an OFF state) of drive signal $U_{DRIVE}$. Test sample $U_{TEST}$ may be provided to comparator circuit 503 where it may be compared with a feedback sample $U_{SAMPLE}$ obtained by feedback circuit 309. In other examples, time-triggered sensor 501 may be configured to sample feedback signal $U_{FB}$ 332 after a different amount of time having any value depending on the particular application. For instance, the amount of time may be between 0.5 µs and 2.0 µs or more, for example, about 0.5 µs, about 0.6 µs, about 0.7 µs, about 0.8 µs, about 0.9 µs, about 1.0 µs, about 1.5 µs, about 2.0 µs, or more. Additionally, the triggering event relating to drive signal $U_{DRIVE}$ may instead be a positive edge of drive signal $U_{DRIVE}$.

As shown, comparator circuit 503 may be configured to receive $U_{SAMPLE}$ and $U_{TEST}$ and compare the voltage of $U_{SAMPLE}$ and $U_{TEST}$ to determine if $U_{SAMPLE}$ may represent a false sample. In some examples, comparator circuit 503 may detect potential false samples by comparing the voltage of $U_{TEST}$ and $U_{SAMPLE}$ to determine if the voltage of $U_{SAMPLE}$ is smaller than the voltage of $U_{TEST}$ by more than a threshold amount. For instance, in some examples, if the output winding 326 voltage (and thus the output voltage $V_{OUT}$) represented by the voltage of $U_{TEST}$ minus the output winding 326 voltage represented by the voltage of $U_{SAMPLE}$ is equal to or greater than 0.7 V, comparator circuit 503 may identify $U_{SAMPLE}$ as a potential false sample and may assert signal $U_{MISS}$. It should be appreciated that the voltage across output winding 326 and the voltage of $U_{FB}$ 332 may or may not be equal depending on the turns ratio of the windings in energy transfer element 308 and the values of resistors in the resistor divider formed by resistors R1 and R2. Thus, to identify a 0.7 V difference in the output winding 326 voltages represented by $U_{TEST}$ and $U_{SAMPLE}$, comparator circuit 503 may look for a voltage difference equal to or different than 0.7 V between $U_{TEST}$ and $U_{SAMPLE}$. Additionally, as will be discussed in more detail with respect to FIG. 6A, 0.7 V may be selected as the threshold voltage due to the approximately 0.7 V drop across output diode D1 309 that causes the output winding 326 voltage to gradually decline by approximately the same amount. However, it should be appreciated that threshold voltages other than 0.7 V may be used depending on the circuit configuration.

MFVP circuit 305 may further include fault counter 505 for tracking the number of false samples identified by comparator circuit 503. In some examples, fault counter 505 may receive signal $U_{MISS}$ from comparator 503 and may be configured to increment an internal counter in response to signal $U_{MISS}$ being asserted. In this way, fault counter 505 may record the number of potential false samples obtained by controller 304. In other examples, fault counter 505 may only keep track of the number of consecutive false samples. Thus, in response to a non-asserted $U_{MISS}$ signal, fault counter 505 may be reset to zero. Fault counter 505 may be further configured to assert fault signal $U_{FAULT}$ in response to the counter reaching a threshold value. For example, fault counter 505 may assert fault signal $U_{FAULT}$ in response to the internal counter reaching four, representing either four non-consecutive assertions of $U_{MISS}$ or four consecutive assertions of $U_{MISS}$, depending on the system configuration. However, it should be appreciated that fault counter 505 may be configured to assert fault signal $U_{FAULT}$ in response to the counter reaching any number, which may represent any number of consecutive or non-consecutive potential false samples.

Figure 6A:
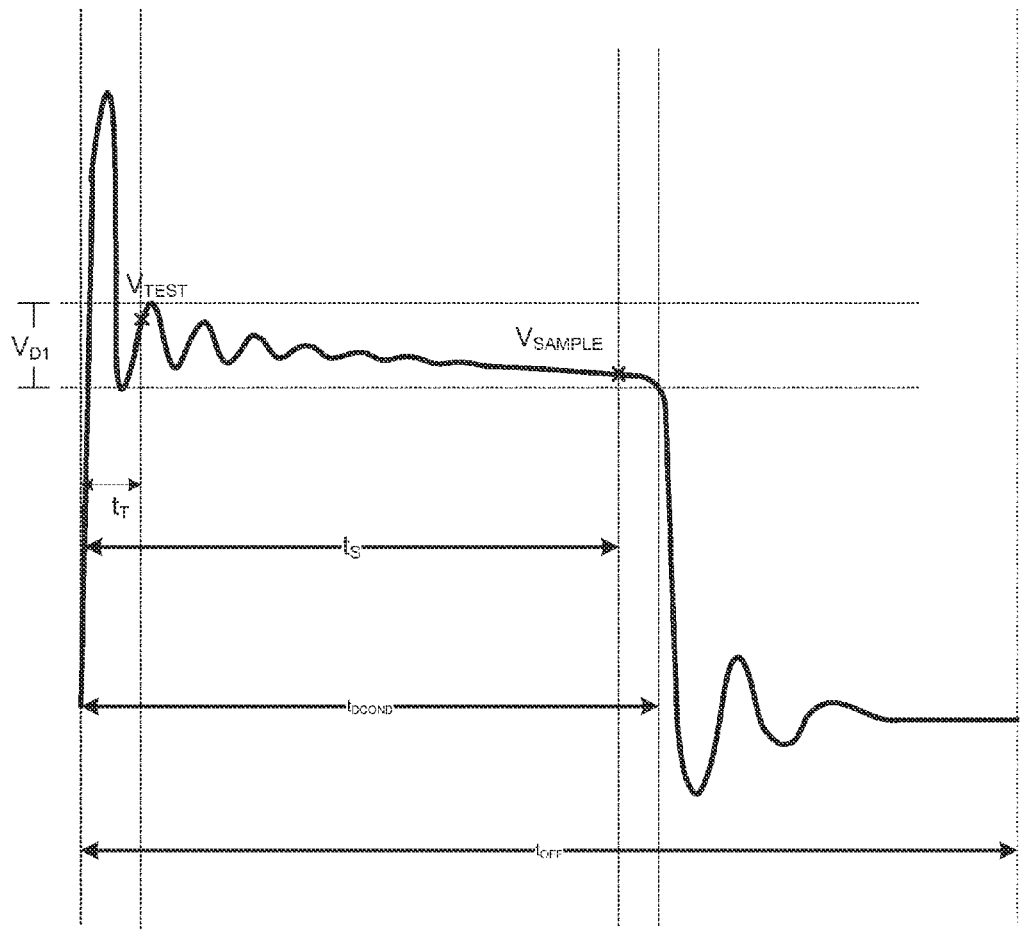
FIG. 6A illustrates an example voltage waveform for the voltage on an output winding of a power converter in accordance with an embodiment of the present invention.

The timing of the voltage samples obtained by feedback circuit 309 and MFVP circuit 305 will now be discussed with respect to FIG. 6A. Similar to FIG. 1, FIG. 6A illustrates an example voltage waveform of the voltage across output winding 326 shortly after power switch 306 is switched to the OFF state. In the illustrated example, $t_T$ represents the delay after power switch 306 is switched to the OFF state before a test sample is taken, $t_S$ represents the delay after power switch 306 is switched to the OFF state before a default sample is taken, $t_{DCOND}$ represents the time that output diode D1 is conducting, and $t_{OFF}$ represents the time that power switch 306 is in the OFF state.

As shown in FIG. 6A, a first sample may be obtained after a time $t_T$ from switch 306 being switched to the OFF state. In some examples, the output winding voltage may be measured at time $t_T$ by time-triggered sensor 501 sampling feedback signal $U_{FB}$ at time $t_T$. The result may be output by time-triggered sensor 501 as signal $U_{TEST}$ having a voltage representative of voltage $V_{TEST}$. In some examples time $t_T$ may be equal to about 0.8 µs. However, it should be appreciated that other values of time $t_T$ may be used depending on the specific application. In some examples, the duration of time $t_T$ may generally be selected to exceed the duration of the initial voltage spike in $V_{OUT}$.

A second sample may be obtained after a time $t_S$ from switch 306 being switched to the OFF state. In some examples, the output winding voltage may be detected at time $t_S$ by feedback circuit 309 sampling feedback signal $U_{FB}$ after a time $t_S$ from switch 306 being switched to the OFF state. The result may be output by feedback circuit 309 as signal $U_{SAMPLE}$ having a voltage representative of voltage $V_{SAMPLE}$. In some examples time $t_S$ may be equal to about 2.5 µs. However, it should be appreciated that other values of time $t_S$ may be used depending on the specific application. In some examples, the duration of time $t_S$ may generally be selected such that the sample is taken during the relatively stable period of time that occurs prior to the end of output diode conduction time $T_{DCOND}$ (similar to the period of time labeled as section B in FIG. 1).

As discussed above, a false sample may be detected based on the voltage difference between the test voltage $V_{TEST}$ and the sample voltage $V_{SAMPLE}$. If the voltage of $V_{SAMPLE}$ is less than the voltage of $V_{TEST}$ by more than a threshold amount, the sample taken at time $t_S$ may be considered a false sample. The threshold difference may be selected based on the circuit design and may be approximately equal to the amount of decline in voltage expected in the output winding 326 voltage after the initial transient period and before the output diode D1 stops conducting. For example power converter 300, a voltage difference of $V_{D1}$, representing the forward voltage drop of output diode D1, may be used substantially as the threshold voltage difference since a decrease in voltage approximately equal to the forward voltage drop of the output diode is expected in the output winding 326 voltage. In some examples, $V_{D1}$ may be approximately equal to 0.7 V. However, it should be appreciated that other threshold voltages may be used depending on the specific application.

Figure 6B:
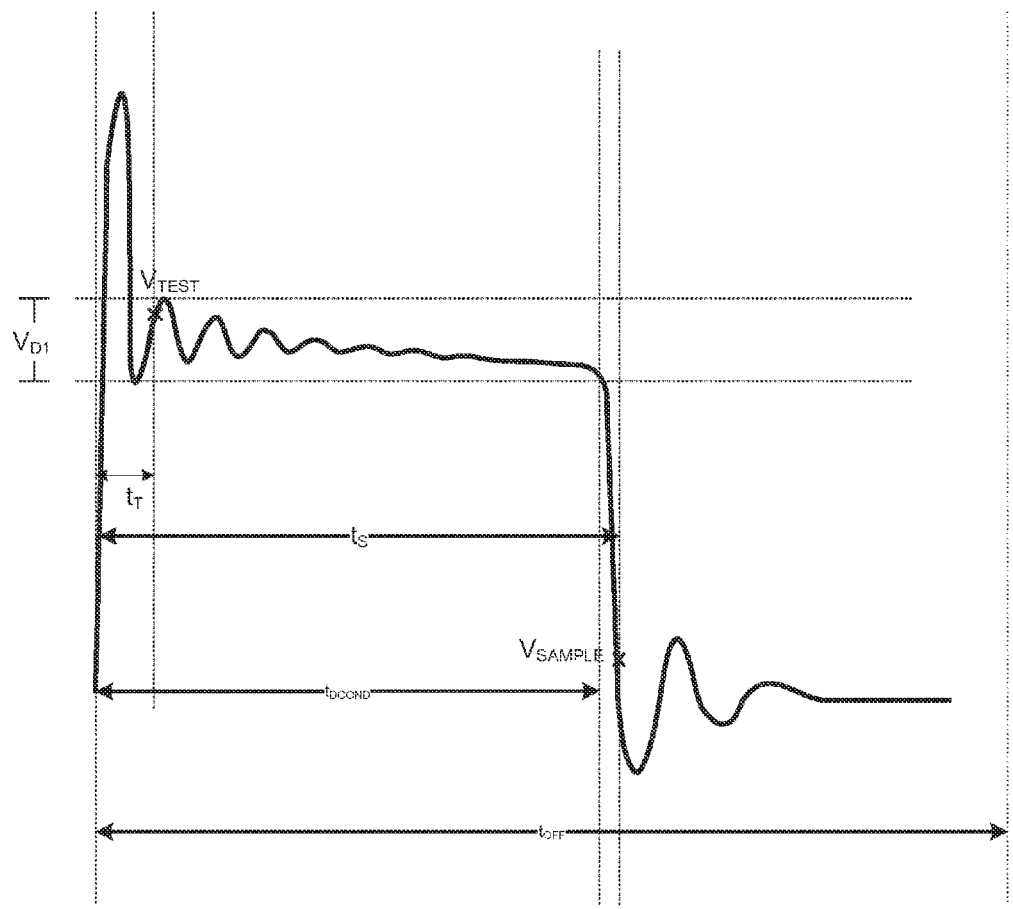
FIG. 6B illustrates an example voltage waveform for the voltage on an output winding of a power converter in accordance with an embodiment of the present invention.

In the example illustrated in FIG. 6A, it can be seen that the difference between $V_{TEST}$ and $V_{SAMPLE}$ is less than $V_{D1}$, so the sample taken at time $t_S$ may be determined to be a good sample. However, as shown in FIG. 6B, if the duration of $t_{DCOND}$ were to decrease (e.g., due to an increase in output voltage $V_{OUT}$) to less than the delay $t_S$, the voltage of $V_{SAMPLE}$ may be significantly lower than the actual output voltage $V_{OUT}$. For example, as shown in FIG. 6B, the difference between $V_{TEST}$ and $V_{SAMPLE}$ may be more than $V_{D1}$ when $t_{DCOND}$ is shorter than time $t_S$. In this example, the sample taken at time $t_S$ may be determined to be a bad sample. It should be appreciated that the components of controller 304 sample and compare voltages from feedback signal $U_{FB}$ 332 rather than the voltage on the output winding. Thus, since the 0.7 V difference discussed above is with respect to the output winding voltage, the actual voltage difference between the compared feedback signal samples may or may not be the same depending on the turns ratio of the windings in energy transfer element 308 and the values of resistors in the resistor divider formed by resistors R1 and R2.

Figure 7:
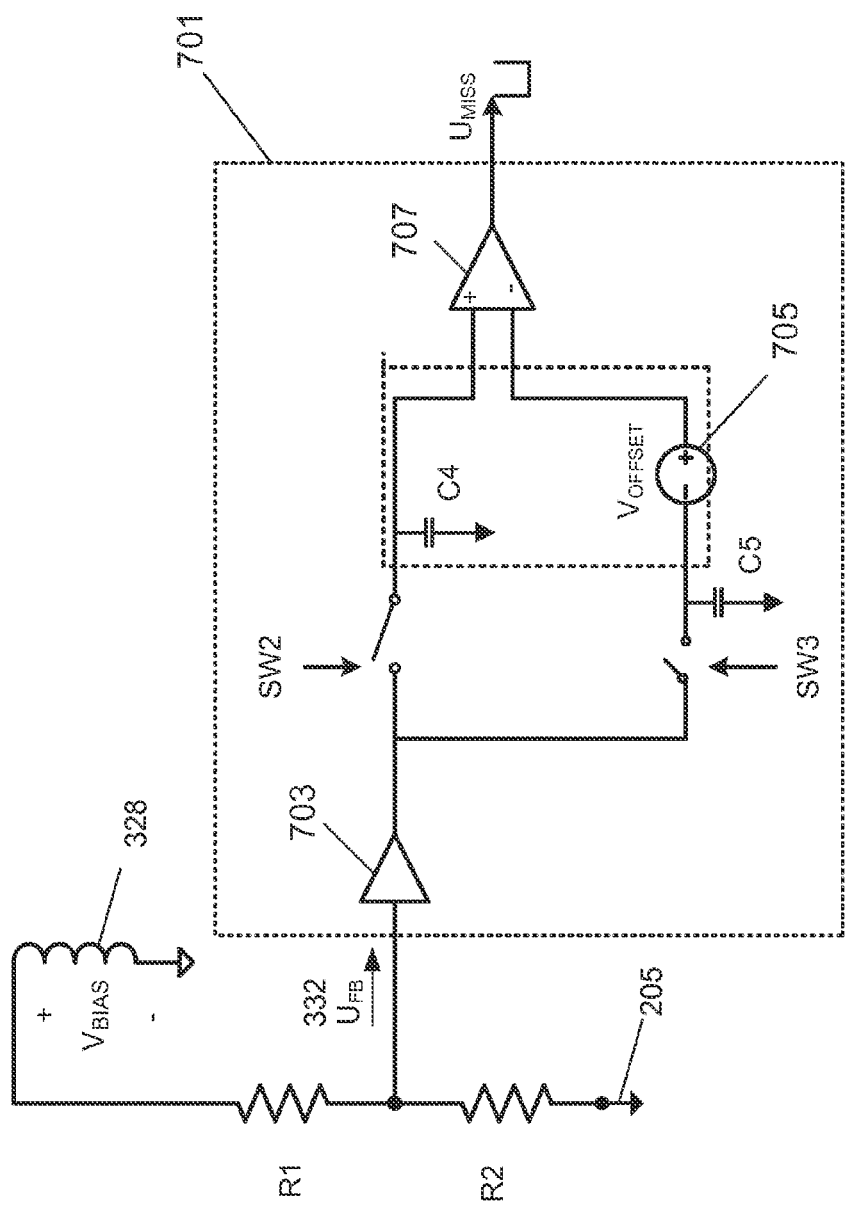
FIG. 7 is a circuit diagram illustrates an example circuit for detecting false feedback voltage samples in accordance with an embodiment of the present invention.

Referring now to FIG. 7, an example circuit 701 for generating and comparing voltage samples is shown. In some examples, circuit 701 may be used to perform the functions described above for feedback circuit 309, time-triggered sensor 501, and comparator 503.

Circuit 701 may include buffer 703 for receiving feedback signal $U_{FB}$ 332. Circuit 701 may further include switches SW2 and SW3 for selectively charging capacitors C4 and C5. In operation, switches SW2 and SW3 may remain closed, allowing capacitors C4 and C5 to charge using feedback signal $U_{FB}$ 332. When a sample is to be taken, one of the switches may be set to the open position, resulting in the corresponding capacitor storing a voltage equal to the voltage of feedback signal $U_{FB}$ 332 at the time the switch was opened. For example, at time $t_T$, a test sample may be obtained by opening switch SW2, leaving a voltage across capacitor C4 equal to the voltage of feedback signal $U_{FB}$ at time $t_T$. Then, at time at time $t_S$, a default feedback sample may be obtained by opening switch SW3, leaving a voltage across capacitor C5 equal to the voltage of feedback signal $U_{FB}$ at time $t_S$.

Circuit 701 may further include operational amplifier 707 for comparing the voltages of capacitors C4 and C5. In some examples, circuit 701 may further include a dc voltage source 705 as an offset, representative of the threshold voltage to increase the voltage applied to the negative terminal of operational amplifier 707. Thus, the voltage of capacitor C4 may be compared with the offset voltage $V_{OFFSET}$ plus the voltage of capacitor C5. This may be used, for example, to determine if the test voltage (voltage on C4) is larger than the sample voltage (voltage on C5) by more than a threshold amount (offset voltage $V_{OFFSET}$). Operational amplifier 707 may assert a miss signal $U_{MISS}$ if the voltage of capacitor C4 is greater than the sum of voltages of capacitor C5 and the offset voltage $V_{OFFSET}$. The offset voltage $V_{OFFSET}$ may be selected to be equal to the threshold voltage (e.g., 0.7 V) as discussed above. It should be appreciated that circuit 701 may include additional circuitry that is not shown.

Figure 8:
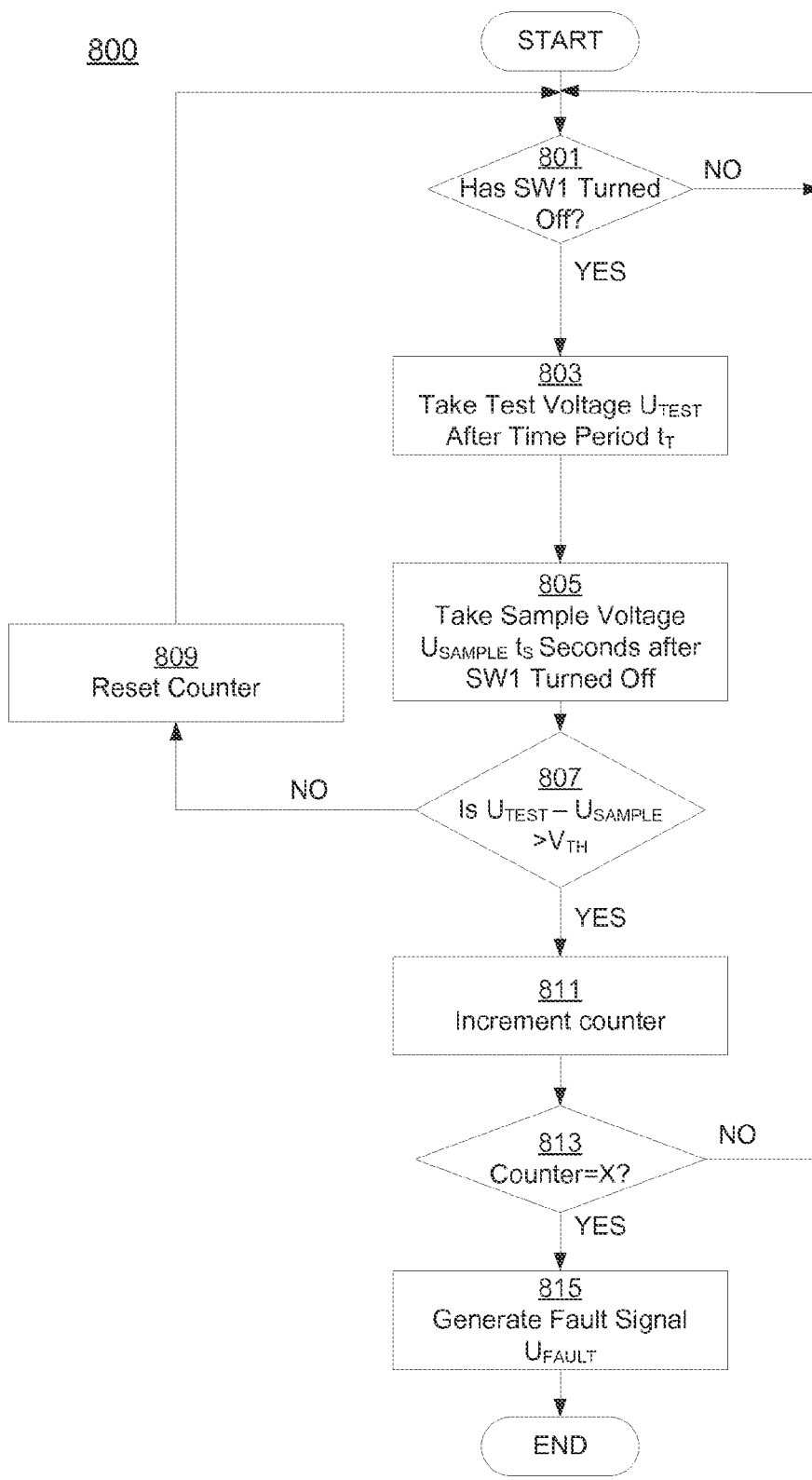
FIG. 8 illustrates an example process for detecting a fault condition resulting from false feedback voltage samples in accordance with an embodiment of the present invention.

Referring now to FIG. 8, an example process 800 for detecting false feedback signal samples obtained by a primary-side regulated power converter is shown. At block 801 of process 800, a power switch is monitored to determine when the switch is closed. For example, drive signal $U_{DRIVE}$ generated by controller 304 may be monitored to determine when power switch 306 of power converter 300 is switched to the OFF state. As discussed above, power may be transferred from the primary winding 324 to the output winding 326 of energy transfer element 308 when switch 306 is turned off.

Upon detection of switch 306 turning off, the process may proceed to block 803. At block 803, a test sample may be generated after a delay of time $t_T$. For example, in some embodiments, time-triggered sensor 501 of controller 304 may wait about 0.8 µs after detecting that switch 306 has turned off before sampling feedback signal $U_{FB}$. A test signal $U_{TEST}$ representative of test voltage $V_{TEST}$ of the sample taken at time $t_T$ may be generated.

At block 805, a sample voltage may be obtained $t_S$ seconds after switch 306 is turned off. For example, in some embodiments, feedback circuit 309 may sample feedback signal $U_{FB}$ 332 about 2.5 µs after switch 306 has switched to the off state. A sample signal $U_{SAMPLE}$ having a voltage representative of the voltage of the sample taken at time $t_S$ may be generated.

At block 807, the difference between the voltage of $U_{TEST}$ and the voltage of $U_{SAMPLE}$ may be compared to a threshold voltage $V_{TH}$ to determine if $U_{SAMPLE}$ may be a false sample. If the difference is greater than the threshold value $V_{TH}$, the process proceeds to block 811. If, however, the difference is equal to or less than the threshold value $V_{TH}$, the process proceeds to block 809. For example, in some embodiments, comparator 503 may be used to compare the voltage of $U_{TEST}$ and $U_{SAMPLE}$.

If, at block 807, it is determined that $U_{SAMPLE}$ may be a false sample, a counter may be incremented at block 811. The counter may be used to keep track of the number of consecutive false samples obtained. For example, in some embodiments, fault counter 505 may be incremented when a false sample is identified by comparator 503.

At block 813, the count stored by the counter may be compared to a threshold value X. If the counter is equal to the threshold value, it may be determined that a fault condition has occurred and a fault signal may be generated at block 815. However, if the counter is not equal to the threshold value X, the process returns to block 801 to monitor for the next switching event. In this way, the counter may track the number of consecutive potential false samples obtained. For example, in some embodiments, when the value stored by counter 505 reaches 4, a fault signal $U_{FAULT}$ may be generated and transmitted to driver circuit 311 of controller 304. Receipt of fault signal $U_{FAULT}$ by driver circuit 311 may cause the controller 304 to enter an auto-restart mode to avoid an excessively large voltage from being produced at the output of power converter 300.

If, at block 807, it is instead determined that $U_{SAMPLE}$ may be a good sample, the counter may be reset at block 809. The process may then return to block 801. For example, in some embodiments, fault counter 505 may be reset when a non-false sample is obtained.

While the blocks of process 800 have been presented in a particular sequence, it should be appreciated that they may be performed in any order and that one or more blocks may be performed at the same time. For instance, feedback circuit 309 and MFVP circuit 305 may monitor the drive signal $U_{DRIVE}$ to determine when switch SW1 is turned off while test signal $U_{TEST}$ and sample signal $U_{SAMPLE}$ are compared by comparator 503.

The above description of illustrated examples of the present invention, including what is described in the Abstract, are not intended to be exhaustive or to be limitations to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes, and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

The invention claimed is:

1. A controller for a primary-side regulated power converter, the controller comprising:
   a feedback circuit operable to receive a feedback signal representative of an output of the power converter, the feedback circuit further operable to generate a first feedback signal sample based on the feedback signal;
   a missing feedback voltage protection circuit comprising:
      a time-triggered sensor circuit operable to:
         receive the feedback signal; and
         generate a second feedback signal sample based on the feedback signal; and
      a comparator circuit coupled to the feedback circuit and the time-triggered sensor circuit, wherein the comparator circuit is operable to:
         receive the first feedback signal sample from the feedback circuit and the second feedback signal sample from the time-triggered sensor circuit; and
         generate a miss signal based on a comparison between the first feedback signal sample and the second feedback signal sample,
      wherein the missing feedback voltage protection circuit is further operable to:
         compare the first feedback signal sample with the second feedback signal sample; and
         generate a fault signal based on the comparison of the first feedback signal sample with the second feedback signal sample; and
   a driver circuit coupled to the missing feedback voltage protection circuit, wherein the driver circuit is operable to generate a drive signal for controlling a power switch.

2. The controller of claim 1, wherein the missing feedback voltage protection circuit further comprises a counter coupled to the comparator circuit, wherein the counter is operable to receive the miss signal from the comparator circuit and generate the fault signal in response to receiving a number of consecutive miss signals.

3. The controller of claim 2, wherein the number of consecutive miss signals is 4.

4. The controller of claim 1, wherein the comparator circuit is further operable to perform the comparison between the first feedback signal sample and the second feedback signal sample, and wherein the comparison comprises comparing a voltage of the first feedback signal sample with a voltage of the second feedback signal sample.

5. The controller of claim 4, wherein the comparator circuit is operable to generate the miss signal in response to the voltage of the second feedback signal sample being greater than the voltage of the first feedback signal sample by more than a set amount.

6. The controller of claim 5, wherein the set amount is about 0.7 V.

7. The controller of claim 1, wherein the feedback circuit is operable to generate the first feedback signal sample a first length of time after a negative edge of the drive signal, and wherein the missing feedback voltage protection circuit is operable to generate the second feedback signal sample a second length of time after the negative edge of the drive signal.

8. The controller of claim 7, wherein the second length of time is less than the first length of time.

9. A primary-side regulated power converter comprising:
   a power switch;
   an energy transfer element coupled to the power switch to galvanically isolate an input of the power converter from an output of the power converter and to transfer energy between the input and output of the power converter;
   a bias winding coupled to the energy transfer element, wherein the bias winding is configured to output a bias winding feedback signal representative of an output voltage at the output of the power converter; and
   a controller coupled to the power switch to control the power switch, the controller comprising:
      a feedback circuit operable to receive the bias winding feedback signal, the feedback circuit further operable to generate a first feedback signal sample based on the bias winding feedback signal;
      a missing feedback voltage protection circuit comprising:
         a time-triggered sensor circuit operable to:
            receive the bias winding feedback signal; and
            generate a second feedback signal sample based on the bias winding feedback signal; and
         a comparator circuit coupled to the feedback circuit and the time-triggered sensor circuit, wherein the comparator circuit is operable to:
            receive the first feedback signal sample from the feedback circuit and the second feedback signal sample from the time-triggered sensor circuit; and
            generate a miss signal based on a comparison between the first feedback signal sample and the second feedback signal sample,
         wherein the missing feedback voltage protection circuit is further operable to:
            compare the first feedback signal sample with the second feedback signal sample; and
            generate a fault signal based on the comparison of the first feedback signal sample with the second feedback signal sample; and
      a driver circuit coupled to the missing feedback voltage protection circuit, wherein the driver circuit is operable to generate a drive signal for controlling the power switch.

10. The primary-side regulated power converter of claim 9, wherein the feedback circuit is operable to generate the first feedback signal sample a first length of time after a negative edge of the drive signal, and wherein the missing feedback voltage protection circuit is operable to generate the second feedback signal sample a second length of time after the negative edge of the drive signal.

11. The primary-side regulated power converter of claim 10, wherein the second length of time is less than the first length of time.

12. A method for detecting a fault condition in a primary-side regulated power converter, the method comprising:
   receiving a feedback signal representative of an output of the power converter;

generating a first feedback signal sample using the feedback signal;
generating a second feedback signal sample using the feedback signal;
generating a miss signal based on a comparison between the first feedback signal sample and the second feedback signal sample;
comparing the first feedback signal sample with the second feedback signal sample;
generating a fault signal based on the comparison of the first feedback signal sample with the second feedback signal sample; and
generating a drive signal for controlling a power switch.

13. The method of claim 12, wherein comparing the first feedback signal sample with the second feedback signal sample comprises comparing a voltage of the first feedback signal sample with a voltage of the second feedback signal sample.

14. The method of claim 13, wherein the fault signal is generated in response to the voltage of the second feedback signal sample being greater than the voltage of the first feedback signal sample by more than a set amount.

15. The method of claim 13, further comprising identifying the second feedback signal sample as a false sample in response to the voltage of the second feedback signal sample being greater than the voltage of the first feedback signal sample by more than a set amount.

16. The method of claim 15, wherein the fault signal is generated in response to identifying a number of consecutive false samples.

17. The method of claim 12, wherein the first feedback signal sample is generated a first length of time after a power switch of the primary-side regulated power converter is turned off, and wherein the second feedback signal sample is generated a second length of time after the power switch of the primary-side regulated power converter is turned off.

18. The method of claim 17, wherein the second length of time is less than the first length of time.

19. A controller comprising:
a feedback circuit to be coupled to an output of a power converter to receive a feedback signal representative of an output of the power converter, wherein the feedback circuit is coupled to output a sample signal based on the feedback signal;
a missing feedback voltage protection (MFVP) circuit coupled to the feedback circuit, wherein the MFVP circuit is coupled to:
receive the feedback signal;
generate a test signal based at least in part on the feedback signal;
receive the sample signal from the feedback circuit;
compare the sample signal with the test signal;
generate a missed feedback sample signal in response to a difference between the sample signal and the test signal being greater than a threshold value; and
generate a fault signal based at least in part on the missed feedback sample signal; and
a driver circuit coupled to the feedback circuit, wherein the driver circuit is operable to regulate the output of the power converter by generating a drive signal for controlling a power switch of the power converter, wherein the drive signal is based at least in part on the sample signal, and wherein the driver circuit is coupled to receive the fault signal from the MFVP circuit to indicate a fault condition.

20. The controller of claim 19, wherein the threshold value is substantially equal to a forward voltage drop across an output diode of the power converter.

21. The controller of claim 19, wherein the feedback signal represents an output voltage.

22. The controller of claim 19, wherein the MFVP circuit comprises a fault counter operable to output the fault signal to the driver circuit based at least in part on the missed feedback sample signal.

23. The controller of claim 22, wherein the fault counter is operable to output the fault signal in response to receiving two or more missed feedback sample signals in consecutive switching cycles.

24. The controller of claim 19, wherein the driver circuit inhibits switching of the power switch in response to the fault signal.

25. The controller of claim 19, wherein the driver circuit enters into an auto restart mode in response to the fault signal.

26. The controller of claim 1, wherein the feedback circuit and the missing feedback voltage protection circuit are operable to generate the first feedback signal sample and the second feedback signal sample during the same OFF time of the power switch.

27. The primary-side regulated power converter of claim 9, wherein the feedback circuit and the missing feedback voltage protection circuit are operable to generate the first feedback signal sample and the second feedback signal sample during the same OFF time of the power switch.

28. The controller of claim 19, wherein the feedback circuit and the missing feedback voltage protection circuit are operable to generate the sample signal and the test signal during the same OFF time of a power switch of the power converter.

* * * * *